H. L. SULMAN & H. F. K. PICARD.
RECOVERY OF NICKEL FROM THE ORES.
APPLICATION FILED FEB. 18, 1914.
1,193,734.
Patented Aug. 8, 1916.
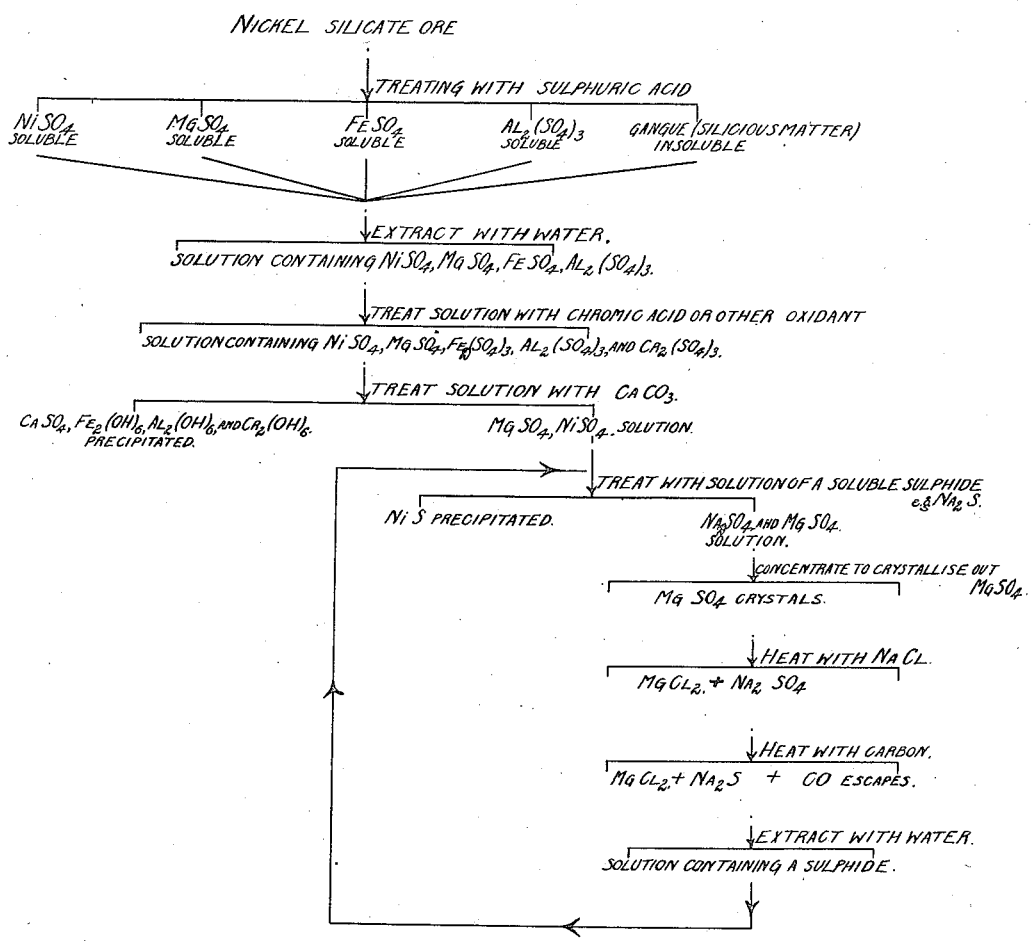

UNITED STATES PATENT OFFICE.

HENRY LIVINGSTONE SULMAN AND HUGH FITZALIS KIRKPATRICK PICARD, OF LONDON, ENGLAND, ASSIGNORS TO THE MADAGASCAR MINERALS SYNDICATE LIMITED, OF LONDON, ENGLAND.

RECOVERY OF NICKEL FROM ITS ORES.

1,193,734.             Specification of Letters Patent.       Patented Aug. 8, 1916.

Application filed February 18, 1914. Serial No. 819,535.

*To all whom it may concern:*

Be it known that we, HENRY LIVINGSTONE SULMAN and HUGH FITZALIS KIRKPATRICK PICARD, subjects of the King of England, both residing at 44 London Wall, London, England, have invented certain new and useful Improvements in the Recovery of Nickel from Its Ores, of which the following is a specification.

This invention is for improvements in or relating to the recovery of nickel from its ores and particularly from garnierite ores.

Processes of extracting nickel from silicate ores, such as garnierite, by means of acid treatment have been known. For example a previous process for the treatment of new Caledonian ores consisted in mixing the crushed ore with concentrated sulfuric acid of 1.8 specific gravity, in quantity sufficient to make it into a thick paste, and after the completion of the exothermic chemical reaction, extracting the mass with hot water to dissolve out the nickel salts, and thereupon purifying the solution by freeing it from iron and magnesia, and precipitating the nickel.

According to the present invention a process for the extraction of nickel from silicate ores containing other metals consists in treating the ore with sulfuric acid, extracting with water so as to obtain an aqueous solution of nickel sulfate and other sulfates, treating the solution by the addition thereto of a soluble sulfid to bring about the precipitation of the nickel, separating the precipitated sulfid, crystallizing out a quantity of magnesium sulfate from the supernatant liquor, calcining it with a chlorid and carbon for the formation of magnesium chlorid and a soluble sulfid, dissolving the magnesium chlorid and the sulfid products in water and adding the solution to a fresh quantity of the solution of mixed sulfates for the precipitation of a further quantity of nickel sulfid.

According to a modification of this invention, the magnesium sulfate and the chlorid, such as sodium chlorid, are first heated together and thereafter carbon is added to the mixture which is submitted to a further heating.

According to a further modification of the invention, to the magnesium sulfate liquors is added sodium chlorid, and from the thus treated solution is crystallized out sodium sulfate, which is treated with a suitable reducing agent for the production of sodium sulfate for use in the treatment of a fresh quantity of the nickel magnesium solutions.

In carrying the present invention into effect, if the solutions obtained by the treatment of the ores with sulfuric acid contain iron as ferrous sulfate, it may be oxidized to ferric sulfate by a suitable oxidant, such as chromic acid or a soluble chromate or bichromate. Then powdered carbonate of lime is stirred into the solution, whereby any free sulfuric acid existing is neutralized, and all iron alumina and chromium salts are precipitated together with sulfate of lime, and the pure nickel and magnesium solution is filtered therefrom. The resulting product is a purified solution of sulfates of nickel and magnesium, and the nickel is precipitated therefrom as nickel sulfid (NiS) by the addition of a soluble sulfid, such as sodium sulfid.

The soluble sulfid is regenerated by crystallizing out from the magnesium sulfate solution a sufficiency of the sulfate and calcining it and then adding, for example, two equivalents of salt, and heating and rabbling with tar or other suitable form of carbon, the reaction being represented by the following equation:—

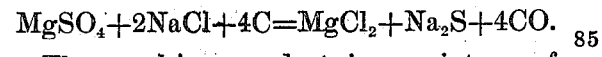

$$MgSO_4 + 2NaCl + 4C = MgCl_2 + Na_2S + 4CO.$$

The resulting product is a mixture of magnesium chlorid and sodium sulfid, which may be dissolved from the ash, and the solution may be added to the mixed sulfate solution, with the result that the nickel will be precipitated as a sulfid according to the following equation:—

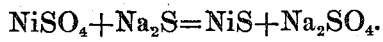

$$NiSO_4 + Na_2S = NiS + Na_2SO_4.$$

In carrying this invention into effect it is preferred, however, to use the modification in which the magnesium sulfate and the chlorid are first heated together and the mixture is thereafter further heated with carbon, in order to prevent the possible loss of sulfur as $SO_2$, before it can be brought into combination with the sodium constituent of the charge. That is to say, in heating the magnesium sulfate, common salt and carbon together, some of the magnesium sulfate may suffer reduction by the carbon into magnesia, sulfur dioxid and carbon monoxid, and such sulfur is lost for the purpose of the desired reaction.

During the first heating of the magnesium sulfate and the chlorid, steam and hydrochloric acid escape, and the latter may be condensed in washing or scrubbing towers of the usual form.

One method of carrying this modification of the invention into effect will now be described, in which sodium sulfid is used in precipitating the nickel, and in which the sodium sulfid is regenerated by heating magnesium sulfate crystallized from the liquors with sodium chlorid and carbon in two steps.

Magnesium sulfate crystal, as for example obtained from nickel silicate ores by treating with sulfuric acid, thereafter extracting with water so as to obtain an aqueous solution of nickel sulfate and other sulfates, purifying the solution from metals other than nickel and magnesium and precipitating the nickel, and thereafter crystallizing out the magnesium sulfate, either as such or partly dehydrated, is mixed with common salt in the proportion of two equivalents of common salt to one equivalent of magnesium chlorid, and the mixture is charged upon the further or cooler half of a reverberatory furnace, or into a pan or other suitable receptacle or apparatus for the purpose, in which it is heated, preferably by reverberatory effect. Steam and hydrochloric acid are liberated and when such evolutions have ceased, the fused mass is run upon the working half of the reverberatory furnace, where a sufficiency of coal slack is well rabbled in. The charge is maintained at the necessary temperature for the reduction of the sulfates to sulfids with liberation of carbon monoxid; when the reaction is commercially complete, the semi-liquid or pasty charge is discharged into barrows or other suitable receptacles, and after cooling is leached with water for the production of the sodium sulfid solution employed as the nickel precipitant. We do not, however, confine ourselves to the particular method given in the above example; thus the mixture of partially dehydrated magnesium sulfate salt and carbon with a suitable binding material, carbonaceous or otherwise, may be briqueted, and the resulting mass may be submitted to a reducing atmosphere at a suitable temperature; or the reaction between magnesium sulfate, sodium chlorid and carbon for the production of substantial proportions of sodium sulfid may be effected in other suitable ways. The nickel sulfid precipitated by this treatment is separated, as for example, by filtration, and if desired is calcined to nickel oxid.

The process according to this invention is particularly applicable to the process described in the prior United States Patent No. 1,091,545, in which the nickel silicate is treated with sulfuric acid in such quantity as to act as a selective solvent of the nickel over the magnesium compounds forming the gangue materials and less than is required to extract the whole of the nickel.

The accompanying drawing illustrates diagrammatically the process hereinbefore described.

What we claim as our invention and desire to secure by Letters Patent is:—

1. The herein described process comprising precipitating nickel from a solution of nickel and other sulfates, obtained by treating nickel silicate ores containing magnesium with sulfuric acid, crystallizing out a quantity of magnesium sulfate from the super-natant liquor, converting the magnesium sulfate into magnesium chlorid and a soluble sulfid, dissolving the magnesium chlorid and the sulfid products in water, and adding the solution thus obtained to a fresh quantity of the solution of mixed sulfates, for the purpose described.

2. The herein described process comprising precipitating nickel from a solution of nickel and other sulfates, obtained by treating nickel silicate ores containing magnesium with sulfuric acid, crystallizing out a quantity of magnesium sulfate from the super-natant liquor, converting the magnesium sulfate into magnesium chlorid and a soluble sulfid, by means of a suitable chlorid and carbon, dissolving the magnesium chlorid and the sulfid products in water, and adding the solution thus obtained to a fresh quantity of the solution of mixed sulfates, for the purpose described.

3. The herein described process comprising precipitating nickel from a solution of nickel and other sulfates, obtained by treating nickel silicate ores containing magnesium with sulfuric acid, by the addition thereto of a soluble sulfid, crystallizing out a quantity of magnesium sulfate from the super-natant liquor, converting the magnesium sulfate into magnesium chlorid and a soluble sulfid, by means of a suitable chlorid and carbon, dissolving the magnesium chlorid and the sulfid products in water, and adding the solution thus obtained to a fresh quantity of the solution of mixed sulfates, for the purpose described.

4. The herein described process comprising precipitating nickel from a solution of nickel and other sulfates, obtained by treating nickel silicate ores containing magnesium with sulfuric acid, crystallizing out a quantity of magnesium sulfate from the super-natant liquor, heating the separated magnesium sulfate with a chlorid, adding carbon and further heating the mixture to produce magnesium chlorid and a soluble sulfid, dissolving the magnesium chlorid and the sulfid products in water, and adding the solution thus obtained to a fresh quantity of the solution of mixed sulfates, for the purpose described.

5. The herein described process comprising precipitating nickel from a solution of nickel and other sulfates, obtained by treating nickel silicate ores containing magnesium with sulfuric acid, by the action of sodium sulfid, crystallizing out a quantity of magnesium sulfate from the super-natant liquor, converting the magnesium sulfate into magnesium chlorid and a soluble sulfid, dissolving the magnesium chlorid and the sulfid products in water, and adding the solution thus obtained to a fresh quantity of the solution of mixed sulfates, for the purpose described.

In testimony whereof we have signed our names to this specification in the presence of two subscribing witnesses.

HENRY LIVINGSTONE SULMAN.
HUGH FITZALIS KIRKPATRICK PICARD.

Witnesses:
H. D. JAMESON,
W. E. ROGERS.